May 17, 1960     H. H. KISTNER     2,936,777
VALVE SEAT AND SEALING VALVE UNIT
Filed May 22, 1957
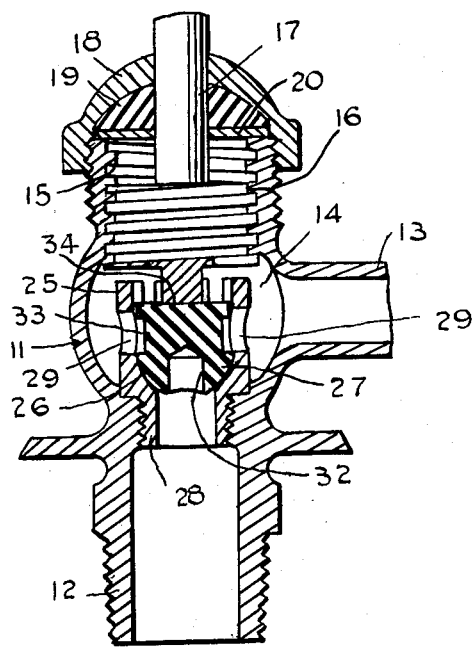
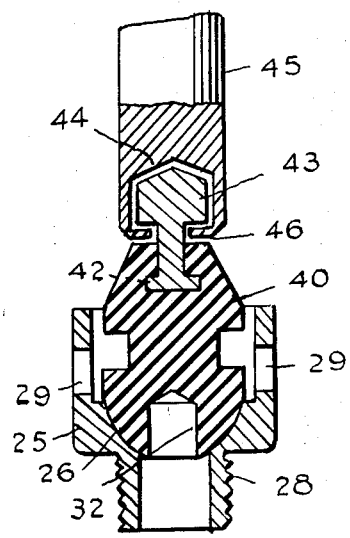
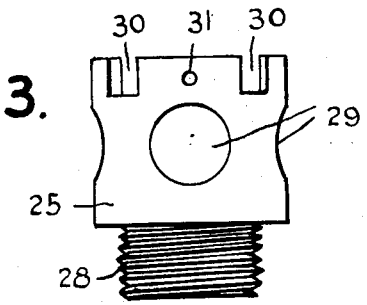
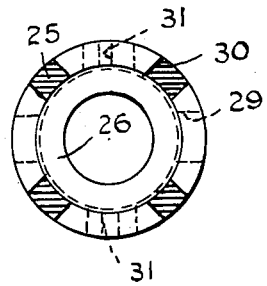
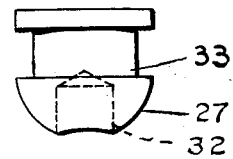
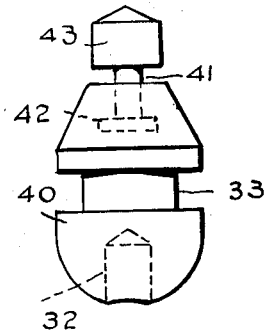
INVENTOR
HERMAN H. KISTNER
BY *Holcombe, Wetherill & Brisebois*
ATTORNEYS,

2,936,777
VALVE SEAT AND SEALING VALVE UNIT

Herman H. Kistner, Glen Ridge, N.J.

Application May 22, 1957, Serial No. 660,942

12 Claims. (Cl. 137—454.5)

This invention relates particularly to shut-off valves of the domestic type having replaceable seat and sealing valve elements, but is applicable to pipe lines for carrying fluids generally, including steam, oil and gas as well as hot and cold water.

The invention aims to provide a mating seat and sealing valve assembly or unit having wearing faces of metal and hard rubber, nylon, polythylene or other suitable material capable of being shaped, easily replaced when worn, either separately or as a unit, and not subject to rapid deterioration in service like the leather and soft rubber washers heretofore largely used for packing water faucets and flush tank fixtures.

Further objects of the invention are to reduce maintenance costs and prolong the useful life of the valve as a whole, including the threaded members and the working faces of the seat and sealing members, to prevent leakage producing dripping, and to reduce the noise of operation while promoting smooth, uniform flow at any desired rate or setting.

The aims and objects of the invention, and its advantages over valves as heretofore constructed, are more fully set forth in connection with the following description of preferred embodiments of the invention illustrated in the accompanying drawings, wherein Fig. 1 is a sectional view on the principal axis of a "leakless" water faucet type of shut-off valve having a part-spherical seat; Fig. 2 is a similar view of the working parts of a modified form of valve having a floating swivel connection between the sealing valve member and valve stem; Fig. 3 is a side elevation; and Fig. 4 is a plan view of the valve seat; Fig. 5 is a side view of the sealing valve member shown in Fig. 1; and Fig. 6 is a side view of the sealing valve member shown in Fig. 2.

In the form of the invention illustrated in Figs. 1, 3, 4 and 5, the valve body 11 is of conventional form having an inlet branch 12 adapted to be connected to the supply main, and an outlet branch 13 either discharging directly into a basin or other receptacle or provided with a screw connection or other device for attaching a hose or distributing pipe, as is usual in domestic water systems. The valve body may be made of cast iron, brass, aluminum or alloy metal of adequate strength and durability and not easily corroded by the water or other liquid or fluid for controlling which it is intended.

Within the body of the valve is a chamber 14 open to the inlet and outlet branches and also having a valve stem opening in alinement with the axis of the inlet opening and provided with internal screw threads 15 to receive the threaded stem 16 of the operating member 17 of the valve. The exterior of the valve body surrounding the valve stem opening is advantageously provided with screw threads for securing the internally threaded closing cap 18 to the body 11 as is well understood in this art.

Between the closing cap and the valve stem any suitable form of packing material or preformed gasket 19 may be provided, preferably so arranged as to be readily tightened as necessary, and removable and replaceable when worn out in service. In the form of the invention illustrated, a washer 20 is placed between the end of the valve body and the packing material 19 so that the latter may be squeezed into close contact with the valve stem by screwing on the cap and thereby kept tight at all times against leakage around the valve stem, but there are many kinds of valve stem packing that are suitable for preventing such leakage and my invention is not restricted to any particular design or material.

The tubular valve seat member 25, which according to my invention is removable from the valve body, is preferably made of brass or other non-corrodible metal of sufficient hardness to withstand wear satisfactorily, and is provided with a part-spherical annular seat or working face 26 in its interior for receiving a part-spherical sealing valve member 27 provided with a correspondingly shaped working face.

The valve seat member 25 has an externally threaded hollow stem 28 which screws into the internally threaded inlet branch 12 of the valve body 11 and supports the seat 26 in axial alinement with the valve stem opening and valve operating member 17. Spaced outlet opening 29, symmetrically positioned in the cylindrical side wall of the tubular valve seat member 25 provide means for the escape of water or other fluid flowing through the valve without undue turbulence and noise. The opposite end of the tubular valve seat member is provided with castellations 30 to permit it to be screwed into place in the valve body and removed therefrom as desired without disconnecting the valve body from the water system. Small diametrically opposed side wall openings 31 are also provided in the castellated end of the valve seat member for assisting in the removing it from the valve body through the valve stem opening when it is desired to replace it.

The sealing valve member 27 itself is preferably made of non-metallic material not affected by the water or other substances passing through the valve. In the form of the invention shown in the drawings, it has one end provided with a part-spherical face for engaging the valve seat 26, this face being of annular shape surrounding an axial cavity 32 and bounded by an encircling groove 33. The other end of the sealing valve member is flat to engage the flat end face 34 of the valve operating member 17. The cavity 32 is slightly smaller in diameter than the inlet opening through the valve seat 26 and of a depth somewhat greater than its diameter. This cavity and the encircling groove 33 provide a stabilizing effect for promoting smooth opening and functioning of the valve in its normal operation to prevent chatter and wear. The flat end of the sealing valve member, which valve member is slightly smaller than the passage through the valve seat member 25 within which it is mounted, in combination with the flat end face 34 of the operating member, also contribute to the smooth functioning of the valve and aid in preventing chatter and wear.

My valve opens and closes with the rotation of the screw threaded stem 17, no springs being required as the pressure of the fluid in the system is sufficient to maintain the end of the sealing valve member tight against the end of the operating member when the valve is partly or fully open; and the flow of fluid through the valve seat member and around the part-spherical body of the sealing valve member into the groove 33 and out through the holes 29 and around the upper end of the valve assembly, serves to center the sealing valve member and prevent lateral displacement thereof when separated from the valve seat.

In the modified form of construction shown in Figs. 2 and 6, the sealing valve member 40 is provided at its end remote from the part-spherical seat engaging portion with a metal plug 41, which has a flanged end 42 embedded in the end of the sealing valve member and an enlarged head 43 loosely swivelled in a cavity 44 in the end of the valve operating member 45, by means of an inturned flange 46 formed by spinning in the edge of the cavity to loosely embrace the stem of the plug. The outer end face of the flange 46 is accurately formed to lie in a plane normal to the axis of the operating member 45 for maintaining the sealing valve member 40 with its axis parallel to the axis of the operating member in all open positions of the sealing valve member as well as in its closed position.

This self-alining construction is particularly advantageous for long stem valves and valves with soft metal parts which are subject to wear in the threads or guide means so as to fail to aline exactly with the central axis of the valve body and seat 26. The self-alining feature permits the sealing valve member and valve seat to line up accurately when the valve is closed and also maintains this alinement when the valve is partly or fully open, thereby assisting in balancing the sealing valve member in the center of flow at all times without chatter and promoting uniform flow through the valve at a comparatively low speed with accompanying decrease in turbulence and diminution of noise.

Thus the advantages of my invention are: reasonable first cost, smooth noiseless operation, long life with no dripping or leaking, and ready replacement of the sealing valve member and seat member if wear makes this desirable.

The invention is not restricted to the particular uses described nor to the specified materials used or the exact shapes and dimensions of the parts as shown, but what I desire to secure by Letters Patent is as follows:

I claim:

1. A unitary valve seat and sealing valve assembly comprising a hollow seat member having an axis of symmetry and means operable upon rotation thereof for removably securing it within a valve housing with said axis of symmetry in substantial alinement with a principal axis of said housing, said seat member including an inlet passage surrounded at its inner end by an annular seat concentric with said axis of symmetry, said assembly also comprising a non-metallic sealing valve member loosely mounted within said seat member and having a working face adapted to engage said seat, said seat sloping outwards away from said inlet passage along the line of flow therein to provide a centering means for said sealing valve member, the working face of said sealing valve member being sloped outwards and shaped to conform to the shape of said seat and the opposite face of said sealing valve member being flat and normal to said axis of symmetry, said sloping working face being formed around an axial cavity of a depth substantially equal to the axial length of said sloping working face, together with a flange on said seat member loosely encompassing said valve member and provided with means for receiving a removing tool for rotating said seat member.

2. A valve seat and sealing valve assembly as set forth in claim 1 in which the valve seat and working face of the sealing valve member are part-spherical.

3. A valve seat and sealing valve assembly as set forth in claim 1 in which the valve seat member is tubular and the flange provides a continuous splash retaining wall encircling the annular seat portion having an axial length at least as great as the diameter of the inlet passage and provided with circumferentially spaced openings for discharging fluid outwardly, and the sealing valve member is provided with an encircling groove between its working face and flat end positioned at least partly in transverse alinement with the side wall openings in said seat member in normal operating positions of the valve.

4. A valve seat and sealing valve assembly as set forth in claim 3 in which the flat end of the sealing valve member is slightly less in diameter than the inner diameter of the adjacent side wall of the tubular seat member to pass a portion of the fluid admitted through the inlet passage while permitting lateral adjustment of the flat end of the sealing valve member with respect to the seat member to conform to any misalinement of the wearing faces of the sealing valve and seat.

5. A valve seat and sealing valve assembly as set forth in claim 4 in which the valve seat and the working face of the sealing valve member are part-spherical.

6. A shut-off and control valve for fluid conducting pipes of the type comprising a chambered valve body having angularly disposed inlet and outlet pipe connection openings in its wall and an operating member movably mounted in an opening in said wall in axial alinement with a principal axis of said valve body, in combination with a tubular seat member removably secured in said body with its axis in alinement with said last named principal axis and one end in communication with said pipe connection opening and with its opposite end in axial alinement with said operating member opening, and an axially symmetrical non-metallic sealing valve member mounted within said tubular seat member, said seat member being smaller than said operating member opening and removable and replaceable together with said sealing valve member through said opening, said sealing valve member having an annular sloping working face at one end for engaging said seat member and a flat face at its opposite end for engaging said operating member, said sloping working face being formed around an axial cavity of a depth approximately equal to one-half the diameter of the sealing valve member, and said seat member having an annular seat symmetrical about its axis with an outwardly sloping working face shaped to conform to the working face of said sealing valve member and a peripheral side wall encircling the outer edge of said working face and surrounding said sealing valve member with an annular space between said side wall and said sealing valve member, said side wall having circumferentially spaced outwardly directed openings disposed in transverse alinement with an intermediate circumferentially grooved portion of said sealing valve member, whereby the flow of fluid past said working faces is reduced in velocity in said annular space and discharged into the chamber in said valve body at a plurality of places in different outward directions while maintaining said sealing valve member centrally disposed with respect to said seat at a constant distance therefrom at each open setting of said operating member.

7. A shut-off and control valve as set forth in claim 6 in which the valve seat and working face of the sealing valve member are part-spherical.

8. A shut-off and control valve as set forth in claim 7 in which the sealing valve member is provided at its flat end with a loose connection to the operating member permitting limited lateral and annular movement of one with respect to the other.

9. A shut-off and control valve as set forth in claim 6 in which the circumferential groove of the sealing valve member is intermediate its ends in transverse alinement with the openings in the side wall of the valve seat member in open position of said valve.

10. A sealing valve member for a shut-off and control valve having an annular inwardly and downwardly sloping seat of part-spherical contour concentric with its principal axis and an operating stem with a flat bearing face also concentric with said axis, said sealing valve member comprising a cylindrical body having an annular working face of part-spherical contour at one end and a flat bearing face at its opposite end adapted to engage the bearing face of said stem, said working face being symmetrical about the axis of said body and sloping inwardly with respect to said axis at the end away from said bearing face, said sloping portion being formed around an axial cavity of substantial depth in the end of said body and concentric therewith, and said body being formed with a circumferential groove located between said working face and said bearing face such that said sealing valve member is balanced in weight and shaped to maintain said sealing valve member in stream-lined relationship with the flowing stream when installed in a valve.

11. A sealing valve member as set forth in claim 10 made of synthetic plastic.

12. A sealing valve member as set forth in claim 11 made of nylon.

References Cited in the file of this patent

UNITED STATES PATENTS

| | | |
|---|---|---|
| 594,633 | Lunken | Nov. 30, 1897 |
| 688,166 | Gaylord | Dec. 3, 1901 |
| 937,629 | Muller | Oct. 19, 1909 |
| 991,095 | Schrode | May 2, 1911 |
| 1,686,849 | Frauenheim | Oct. 9, 1928 |
| 1,898,519 | Aull | Feb. 21, 1933 |
| 1,950,749 | Ross | Mar. 13, 1934 |
| 2,192,339 | Wilson | Mar. 5, 1940 |
| 2,222,466 | Polit | Nov. 19, 1940 |
| 2,429,783 | Weiss | Oct. 28, 1947 |
| 2,741,997 | Parker | Apr. 17, 1956 |
| 2,762,602 | St. Clair | Sept. 11, 1956 |
| 2,846,182 | Charlton | Aug. 5, 1958 |

FOREIGN PATENTS

| | | |
|---|---|---|
| 2,529 | Great Britain | Feb. 4, 1896 |
| 402,226 | Great Britain | Nov. 30, 1933 |
| 423,144 | Great Britain | Jan. 25, 1935 |
| 448,773 | Great Britain | Jan. 6, 1936 |